(12) United States Patent  
Koarai

(10) Patent No.: US 7,770,953 B2
(45) Date of Patent: Aug. 10, 2010

(54) VEHICLE CONSOLE WITH ADJUSTABLE ARMREST

(75) Inventor: Manabu Koarai, Tokyo (JP)

(73) Assignee: Moriroku Company, Ltd., Tokyo (JP)

( * ) Notice: Subject to any disclaimer, the term of this patent is extended or adjusted under 35 U.S.C. 154(b) by 127 days.

(21) Appl. No.: 12/207,532

(22) Filed: Sep. 10, 2008

(65) Prior Publication Data

US 2009/0066103 A1 Mar. 12, 2009

(30) Foreign Application Priority Data

Sep. 10, 2007 (JP) ............................. 2007-233641

(51) Int. Cl.
*B60R 13/00* (2006.01)
(52) U.S. Cl. .................... 296/24.34; 296/37.8
(58) Field of Classification Search .............. 296/24.34, 296/1.09, 153, 24.46, 37.1, 115, 37.12, 37.8; 224/539, 926; 248/311.2; 297/188.19, 188.14, 297/188.17, 411.35, 188.16
See application file for complete search history.

(56) References Cited

U.S. PATENT DOCUMENTS

| 5,845,965 | A  | * | 12/1998 | Heath et al. ............ 297/188.19 |
| 6,045,173 | A  | * | 4/2000  | Tiesler et al. ............. 296/37.8 |
| 6,419,314 | B1 | * | 7/2002  | Scheerhorn ............... 296/37.8 |
| 6,719,367 | B2 | * | 4/2004  | Mic et al. ................. 296/37.8 |
| 7,029,049 | B2 | * | 4/2006  | Rockafellow et al. ...... 296/1.09 |
| 7,296,839 | B2 | * | 11/2007 | Scheerhorn ............... 296/24.34 |
| 7,413,229 | B2 | * | 8/2008  | Kukucka et al. .......... 296/24.34 |
| 7,416,235 | B2 | * | 8/2008  | Rajappa et al. ........... 296/24.34 |
| 2006/0279123 | A1 | * | 12/2006 | Bazinski et al. ......... 297/411.35 |
| 2007/0132284 | A1 | * | 6/2007  | Ekladyous et al. ...... 297/188.17 |
| 2007/0262632 | A1 | * | 11/2007 | Cody et al. ............. 297/411.35 |

FOREIGN PATENT DOCUMENTS

| JP | 8-113086 A | 5/1996 |
| JP | 2001-080423 A | 3/2001 |
| JP | 2003-237476 A | 8/2003 |

\* cited by examiner

*Primary Examiner*—Kiran B. Patel
(74) *Attorney, Agent, or Firm*—Leydig, Voit & Mayer, Ltd.

(57) ABSTRACT

A vehicle console with an adjustable armrest has a single operation knob at a fore-end of an armrest to open and close a storage well and to adjust position of an armrest for individual vehicle drivers. The armrest includes a pair of latch members driven by the operation knob. When the operation knob is at the end of the downward rotation, the latch members are inserted into catch holes in the console box, and the armrest is fixed to the console box in a "lock mode". When the operation knob is halfway from the "lock mode", the latch members are drawn out of the catch holes but remain in grooves in the console box in a "semi-lock mode", wherein the armrest can slide along the grooves but cannot open the storage well. When the operation knob is drawn up to the end of the upward direction, the latch members are drawn out of the grooves and the armrest is in a "unlock mode" and the storage well can open and close.

10 Claims, 9 Drawing Sheets

VEHICLE CONSOLE WITH ADJUSTABLE ARMREST

BACKGROUND OR THE INVENTION

1. Field of the Invention

The present invention relates to a vehicle console with an adjustable armrest, wherein the armrest performs as a lid for opening and closing a storage well of a console box and the armrest can slide in the fore-and-aft direction of the console to adjust the position of the armrest to individual vehicle drivers. More specifically, the present invention relates to a vehicle console with an adjustable armrest, which can be handled by a single operation knob disposed at the fore-end of the armrest.

2. Description of Related Art

Japanese Patent Public Disclosure No. 2003-237476 discloses a console box comprising a main body of the console box, a lid hinged to the main body and adapted to slide in the fore-and-aft direction of a vehicle, a lid-opening knob disposed at the fore-end of the lid, and a lid-sliding knob disposed under the lid-opening knob.

A base member is hinged to the box body of the console box and the lid is slidably attached to the base member. The console box has a first and second locking devices and a first and second unlocking devices corresponding to the first and second locking devices. The first locking device prevents the base member from rotating with respect to the box body when locked and allows the base member to rotate when unlocked. The second locking device prevents the lid from sliding with respect to the base member when locked and allows the lid to slide in the fore-and-aft direction of the vehicle when unlocked. The first unlocking device is a device for unlocking the first locking device. The second unlocking device is a device for unlocking the second locking device. The first unlocking device is adapted to release the first locking device by pulling the lid-opening knob upwardly. The second unlocking device is adapted to release the second locking device by pulling the lid-sliding knob upwardly.

The first locking device of the above-mentioned console box consists of a pawl member and a catch member for engaging with the pawl member. The pawl member is rotatively attached to the base member. The catch member is disposed in the fore-end of the box body or in the vicinity thereof and is arranged on the upper end of the box body or in the vicinity thereof. The catch member lies anterior to the storage well of the box body. Since the first locking device is located at the fore-end of the base member, the base member extends over the entire length of the box body and the storage well from the pivotal axis of the first locking device to the fore-end of the box body. As a result, the base member becomes large in size and the volume of the dead space between the base member and the lid increases.

In addition, the above-mentioned console box is composed of number of components and complexified in structure, because the console box is provided with the first locking device, the first unlocking device, the second locking device and the second unlocking device, individually.

In the above-mentioned console box, furthermore, the catch member for engaging with the pawl member has to be formed in a part of the box body in order to engage with the pawl member of the first locking device. The catch member is revealed outside when the lid is open, so that the appearance of the console box might be impaired.

SUMMARY OF THE INVENTION

The object of the present invention is to provide a vehicle console with an adjustable armrest, wherein a vehicle driver is allowed to open and close a storage well of a console box and adjust a position of an armrest to individual vehicle drivers by handling a single operation knob.

The other object of the present invention is to provide a device for locking, semi-locking and unlocking an armrest of a vehicle console, which does not have components projecting into a storage well of a console box, and which does not butt against articles put in the storage well, and which makes it possible to increase the volume to contain of the storage well.

Another object of the present invention is to provide a vehicle console with an adjustable armrest, wherein a fore-end of a storage well of a console box has an exterior surface that is flat and smooth.

Further object of the present invention is to provide a device for locking, semi-locking and unlocking an armrest, which is composed of decreased number of parts and can be produced by decreased number of manufacturing processes.

Further object of the present invention is to provide a vehicle console with an adjustable armrest, wherein a base member can be downsized and a dead space or an available void between a base member and an armrest body can be decreased.

The vehicle console with an adjustable armrest according to the present invention comprises a base member disposed in an opening of a box body of the console and lying between a closed position extending along the opening and an open position extending at an angle with the opening, an armrest body attached to the base member and supported to be movable with respect to the base member, one or more grooves formed on the outer surface of the box body and extending in the direction of relative movement between the armrest body and the base member, one or more latch members supported by the armrest body and adapted to be engageable with the one or more grooves when the base member is in the closed position, and the armrest having an operation knob and a mechanism for reciprocating the latch members, wherein the length of a projecting part of the latch members can differ according to the turning angle of the operation knob.

The vehicle console with an adjustable armrest according to the present invention further comprises a concave space formed in the base side of the armrest body and having an opening toward the console. The base member is arranged in the concave space to reduce a dead space in the armrest.

The vehicle console with an adjustable armrest according to the present invention further comprises a pair of the latch members being opposed to each other in the concave space of the armrest, a pair of extension walls being formed along the opening of the storage well of the box body, and a pair of grooves being formed on the outside surface of each of the extension walls so as to receive the latch members.

The vehicle console with an adjustable armrest according to the present invention comprising a plurality of catch holes that are formed in the bottom of the grooves of the extension walls so as to receive the latch members and arranged to leave a prescribed space between the adjacent catch holes in order to lock the armrest at the position of the catch holes into which the latch members are inserted.

The vehicle console with an adjustable armrest according to the present invention has a single operation knob to operate the mechanism for reciprocating the latch members. Since the length of a projecting part of the latch members can differ according to the turning angle of the operation knob, the latch members can provide three kinds of operating modes in combination with the grooves of the extension walls and the catch holes formed in the bottom of the grooves. The first mode is a "lock mode" wherein the latch members are inserted into a pair of catch holes. The second mode is a "semi-lock mode" wherein the latch members are drawn out of the catch holes but still remain within the grooves of the extension walls. The third mode is an "unlock mode" wherein the latch members are engaged with neither the grooves nor the catch holes. In the first mode, the armrest is fixed to the console box at the position of the catch holes into which the latch members are inserted. In the second mode, the latch members are allowed to slide along the grooves so that the armrest can be adjusted to individual vehicle drivers. In the third mode, the armrest can rotate around the pivot shaft to open and close an opening of a storage well of the console box. According to the present invention, all the three modes stated above can be performed by use of an operation knob and a mechanism for reciprocating the latch members.

Since the latch members are reciprocated toward the grooves and the catch holes from the outside of the console box and the grooves are formed on the exterior sides of the console box, the vehicle console of the present invention does not have any projections in the storage well of the console box. Therefore, the storage well facilitates taking articles in and out of the console box and provides the console box with an increased volume for storage.

Since the operation knob and the mechanism for reciprocating the latch members according to the present invention are installed in the armrest, there are no components disposed at the fore-end of the storage well of the console box. Therefore, the fore-end of the storage well of the console box can be formed with a flat and smooth exterior surface. The flat and smooth exterior surface of the front end of the storage well can improve the esthetic merit of the console box because the fore-end of the storage well is certainly exposed when opening the storage well.

Since the "lock mode", "semi-lock mode" and "unlock mode" of the armrest according to the present invention can be performed by use of a single operation knob and a same mechanism for reciprocating the latch members, the number of component parts of the present console and the number of steps for manufacturing the present console can be decreased.

Since the "lock mode", "semi-lock mode" and "unlock mode" of the armrest according to the present invention can be performed by means of the latch members attached to the armrest body and the grooves and catch holes formed on the console box, there is no component parts to be engaged between the base member and the box body of the console. The base member is disposed in the concave space of the armrest body to support the armrest body rotatively and slidably. Therefore, the base member can be downsized to reduce a space between the armrest body and the base member and decrease a dead space between the armrest body and the base member.

According to the present invention, a concave space is formed on the base side of the armrest body to have an opening facing a console body. Since the base member is arranged within the concave space and both the latch members and the mechanism for reciprocating the latch members are arranged on the periphery of the concave space, the dead space between the armrest body and the base member can be reduced moreover.

BRIEF DESCRIPTION OF THE DRAWINGS

The present invention will now be described, by way of examples, with reference to the accompanying drawings, in which.

DETAILED DESCRIPTION OF THE INVENTION

Figure 5:
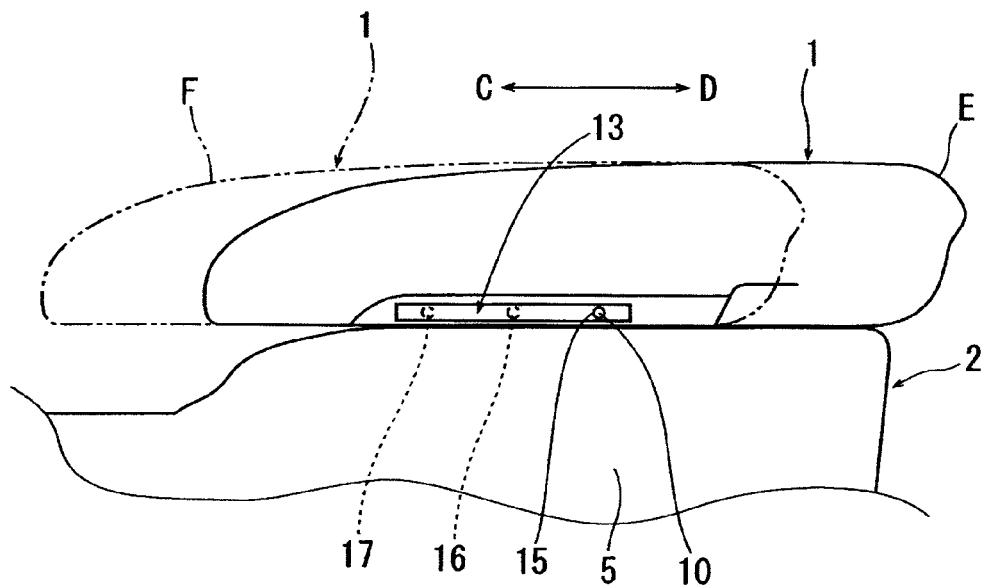
FIG. 5 is a side view of the armrest illustrated in FIG. 1.
Figure 6:
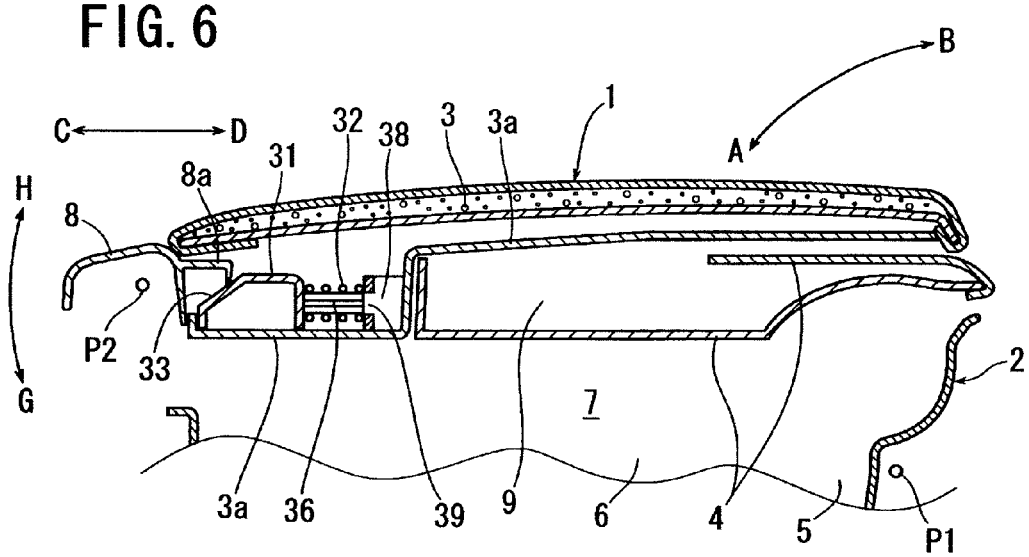
FIG. 6 is a vertical section view of the armrest illustrated in FIG. 1, wherein the armrest is in a "lock mode".
Figure 7:
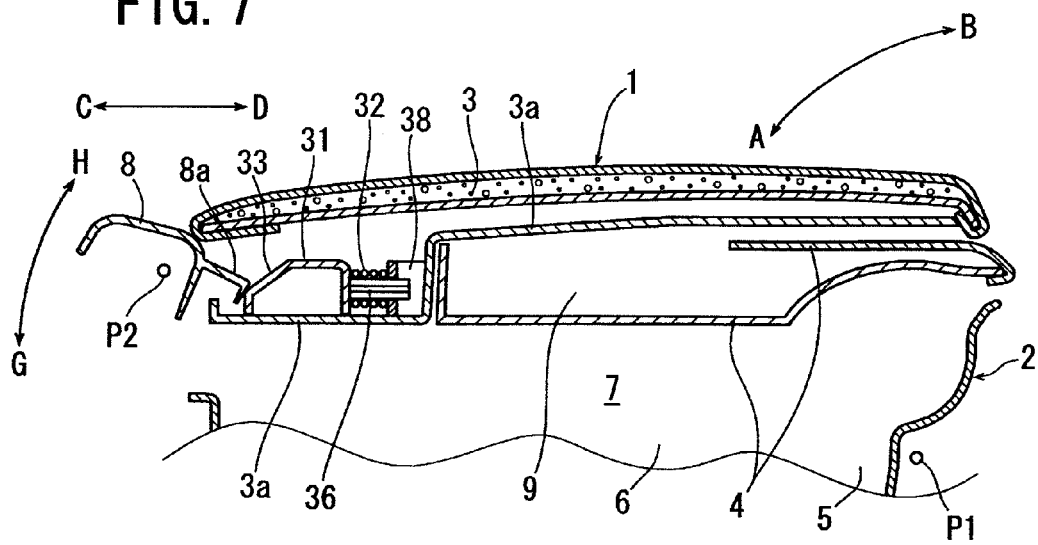
FIG. 7 is a vertical section view of the armrest illustrated in FIG. 1, wherein the armrest is in a "unlock mode".

FIGS. 1-7 illustrate schematic views of a vehicle console 2 to which an armrest 1 is attached. First, a bare outline of a vehicle console 2 with an adjustable armrest 1 according to the present invention is explained with reference to those figures. The armrest 1 comprises an armrest body 3 and a base member 4. A vehicle driver may rest his elbow and/or arm on the armrest body 3. The base member 4 is disposed in an opening 7 of a storage well 6 that is formed in a box body 5 of the console 2. The base member 4 is connected to the box body 5 of the console 2 by means of a hinge joint so that the base member 4 can rotate on a pivot shaft P1, which is shown in FIGS. 6 and 7, in the direction of A-B illustrated in FIG. 3. When the base member 4 is rotated in the B direction and located in the position illustrated in FIG. 3, the storage well 6 is open. When the base member 4 is rotated in the A direction and located in the position illustrated in FIGS. 1 and 2, the storage well 6 is closed. The armrest body 3 is attached to the base member 4 in such a manner that the armrest body 3 can slide over the base member 4 in the direction of C-D illustrated in FIGS. 1, 2, 5-7. Thereby, the armrest body 3 can move between a backward position shown in FIG. 1 and a forward position shown in FIG. 2. In FIG. 5, the armrest body 3 that is located at the backward position is illustrated in solid line E and the armrest body 3 that is located at the forward position is illustrated in imaginary line F. The position of the armrest body 5 can be adjusted to individual drivers with sliding the armrest body 5 between the backward position E and the forward position F.

Figure 8:
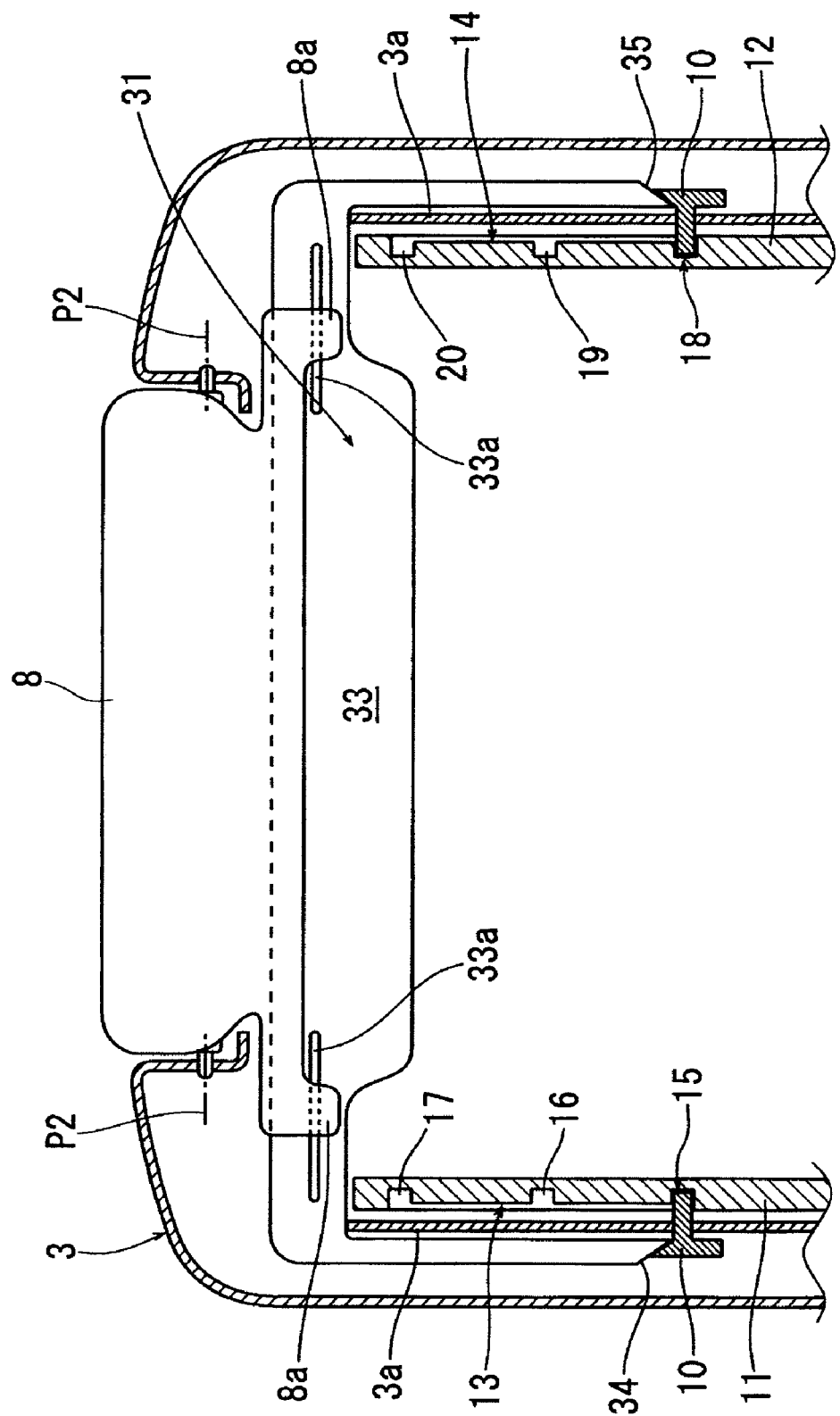
FIG. 8 is a horizontal section view of the armrest illustrated in FIG. 1, wherein the armrest is in the "lock mode".

A device for locking, semi-locking and unlocking an armrest according to the present invention is arranged between the box body 5 of the console 2 and the armrest body 3. The device includes an operation knob 8, latch members 10, grooves 13, 14, catch holes 15-20, and a mechanism for reciprocating the latch members 10. An operation knob 8 is attached to the front end of the armrest body 3. As illustrated in FIGS. 6 and 7, the operation knob 8 can rotate on a pivot shaft P2 in the direction of G-H. The armrest body 3 is provided with a concave space 9 that is open on the side of the console 2. The base member 4 is received in the concave space 9. The armrest body 3 has a pair of latch members 10 that can project into and draw away from the concave space 9. The pair of latch members 10 are opposed to each other in the concave space 9. When the operation knob 8 rotates in the G direction to the end of the rotation as illustrated in FIG. 6, a linkage equipment 31 moves in the C direction so that the latch members 10 project into the concave space 9. When the operation knob 8 is rotated in the H direction as illustrated in FIG. 7, the linkage equipment 31 moves in the D direction so that the latch members 10 are drawn away from the concave space 9 and put in the armrest body 3. A pair of extension walls 11, 12 are formed on the box body 5 of the console 2. The extension walls 11, 12 are positioned on both sides of the opening 7 of the storage well 6 to be opposed to each other. The extension walls 11, 12 extend in the longitudinal direction of the console 2 and they are parallel to each other. A pair of grooves 13, 14 are formed on the outer surfaces of the extension walls 11, 12, respectively. Three catch holes 15, 16, 17 are formed in the bottom of the groove 13 and the corresponding three catch holes 18, 19, 20 are formed in the bottom of the groove 14, as illustrated in FIGS. 5 and 8. The adjacent holes of the catch holes 15, 16, 17 are arranged to space at a equal distance and the catch holes 18, 19, 20 is arranged to correspond to the catch holes 15, 16, 17, respectively. When sliding the armrest body 3 in the direction of C or D, a vehicle driver pulls the operation knob 8 up in the H direction so that the latch members 10 are drawn out of the grooves 13, 14. Thereby, the armrest body 3 is slidable and adjustable in position. After adjusting the position of the armrest body 3, the vehicle driver releases the operation knob 8 to rotate in the G direction so that the latch members 10 are engaged with a pair of catch holes 15 and 18, 16 and 19, or 17 and 20. Thereby, the armrest body 3 is fixed in a position selected by the vehicle driver.

Figure 9:
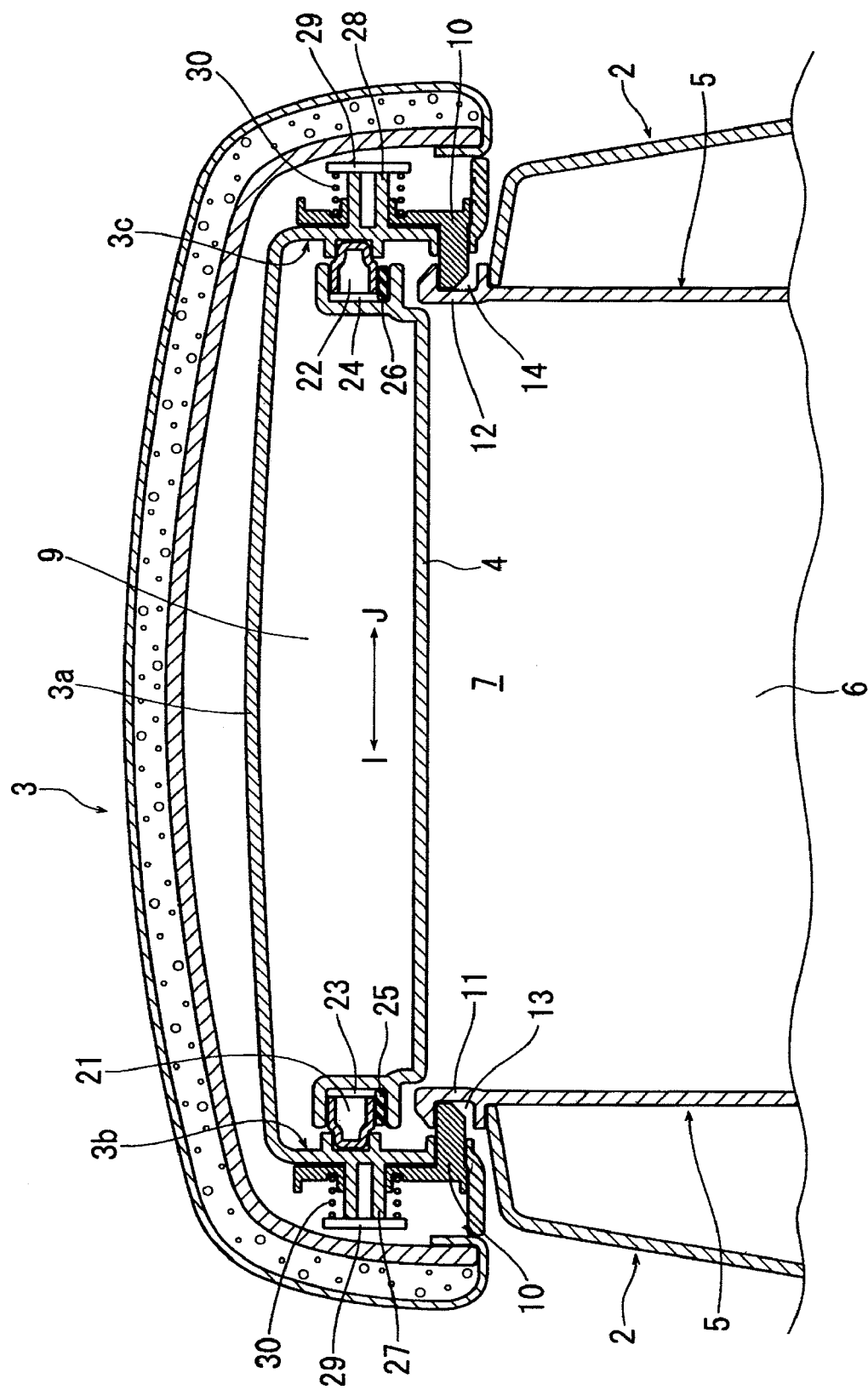
FIG. 9 is a transverse section view of the armrest illustrated in FIG. 1, wherein the armrest is in the "lock mode".

Next, the device for locking, semi-locking and unlocking an armrest according to the present invention is explained more specifically hereinafter with reference to FIGS. 6-12. FIG. 9 shows a structure for coupling the armrest body 3 and the base member 4. A bottom panel 3a is attached to an underside of the armrest body 3 to define the concave space 9 on the underside of the armrest body 3. A pair of guide rails 21, 22 are fixed to the opposed walls 3b, 3c of the concave space 9, respectively. Those guide rails 21, 22 are inserted into slide grooves 23, 24 of the base member 4, which is received in the concave space 9, so that the guide rails 21, 22 can slide along the slide grooves 23, 24, respectively. In the figures, reference numerals 25, 26 denote slide members that are disposed between the guide rails 21, 22 and the slide grooves 23, 24, respectively. The guide rails 21, 22 and the slide grooves 23, 24 extend in the longitudinal direction of the armrest 1 and thereby, the armrest body 3 is slidable in the longitudinal direction of the armrest 1.

Figure 12:
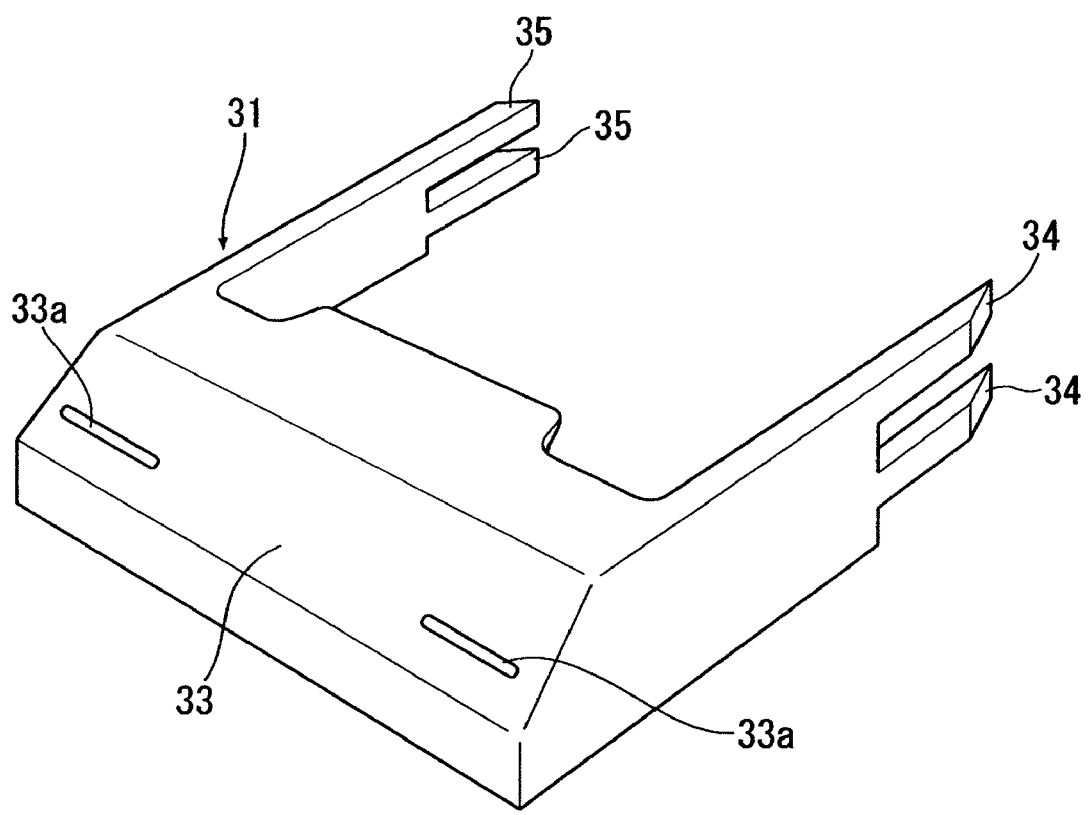
FIG. 12 is a perspective view of a linkage equipment attached to the armrest according to the present invention.

A mechanism for reciprocating the latch members 10, 10 is specified as follows. As illustrated in FIG. 9, supporting columns 27, 28 are integrally formed on the bottom panel 3a of the armrest body 3 in order to support the latch members 10, 10, respectively. The latch members 10, 10 supported by the supporting columns 27, 28 can slide along the periphery of each of the supporting columns 27, 28 in the direction of I-J. A spring bracket 29 is fixed to the head portion of each of the supporting columns 27, 28 and a compression coil spring 30 is disposed between the spring bracket 29, 29 and the latch members 10, 10, respectively. Due to the spring force of the corresponding coil spring 30, the latch members 10, 10 each are always forced to project from the bottom panel 3a. A linkage equipment 31 is arranged between the latch members 10, 10 and the operation knob 8. The linkage equipment 31 is always forced toward the operation knob 8 by the spring force of the compression coil spring 32. As illustrated in FIG. 12, the linkage equipment 31 is generally in the form of a frame and is provided with a cam face 33, which is to be engaged with the operation knob 8, and wedge faces 34, 35, which is to be engaged with the right-and-left latch members 10, 10, respectively. As illustrated in FIGS. 6 and 7, the linkage equipment 31 is provided with a cross-shaped lib 36 having a cross section in the shape of a cross. The cross-shaped lib 36 is formed on the backside of the cam face 33 of the linkage equipment 31. The cross-shaped lib 36 extends toward a supporting wall 38 that is integrally formed on the bottom panel 3a of the armrest body 3. The supporting wall 38 has a guide hole 39 that is in the shape of a cross and the cross-shaped lib 36 is inserted into the guide hole 39 slidably. The compression coil spring 32 is supported by the cross-shaped lib 36 and arranged between the linkage equipment 33 and the supporting wall 38.

Figure 1:
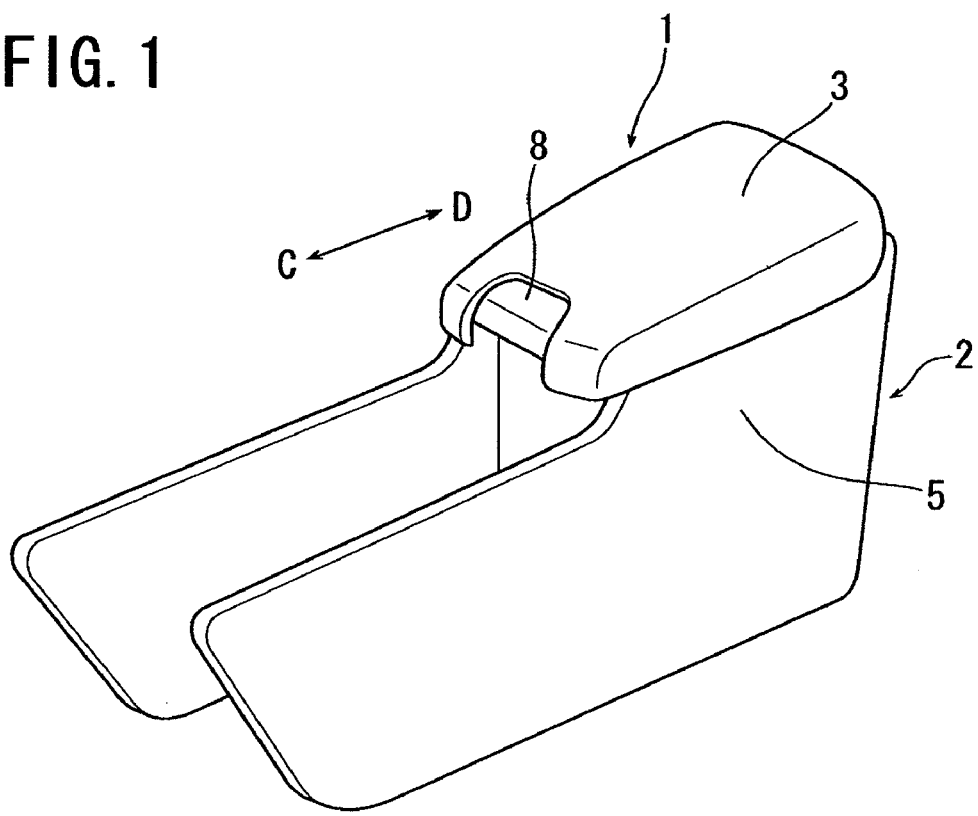
FIG. 1 is a perspective view of a vehicle console having an adjustable armrest according to the present invention.
Figure 2:
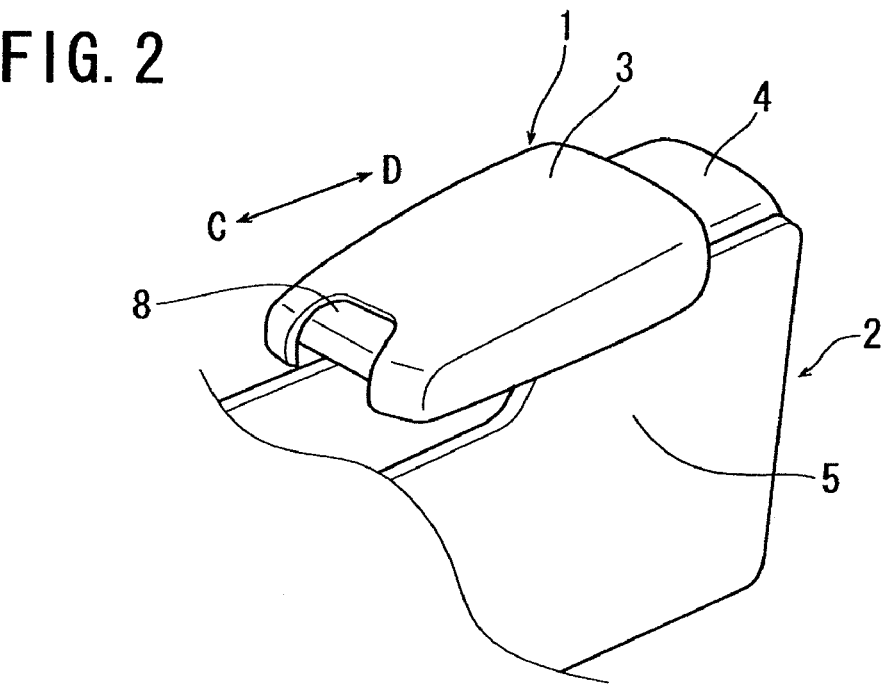
FIG. 2 is a perspective view of a part of the vehicle console illustrated in FIG. 1, wherein the armrest is advanced.
Figure 3:
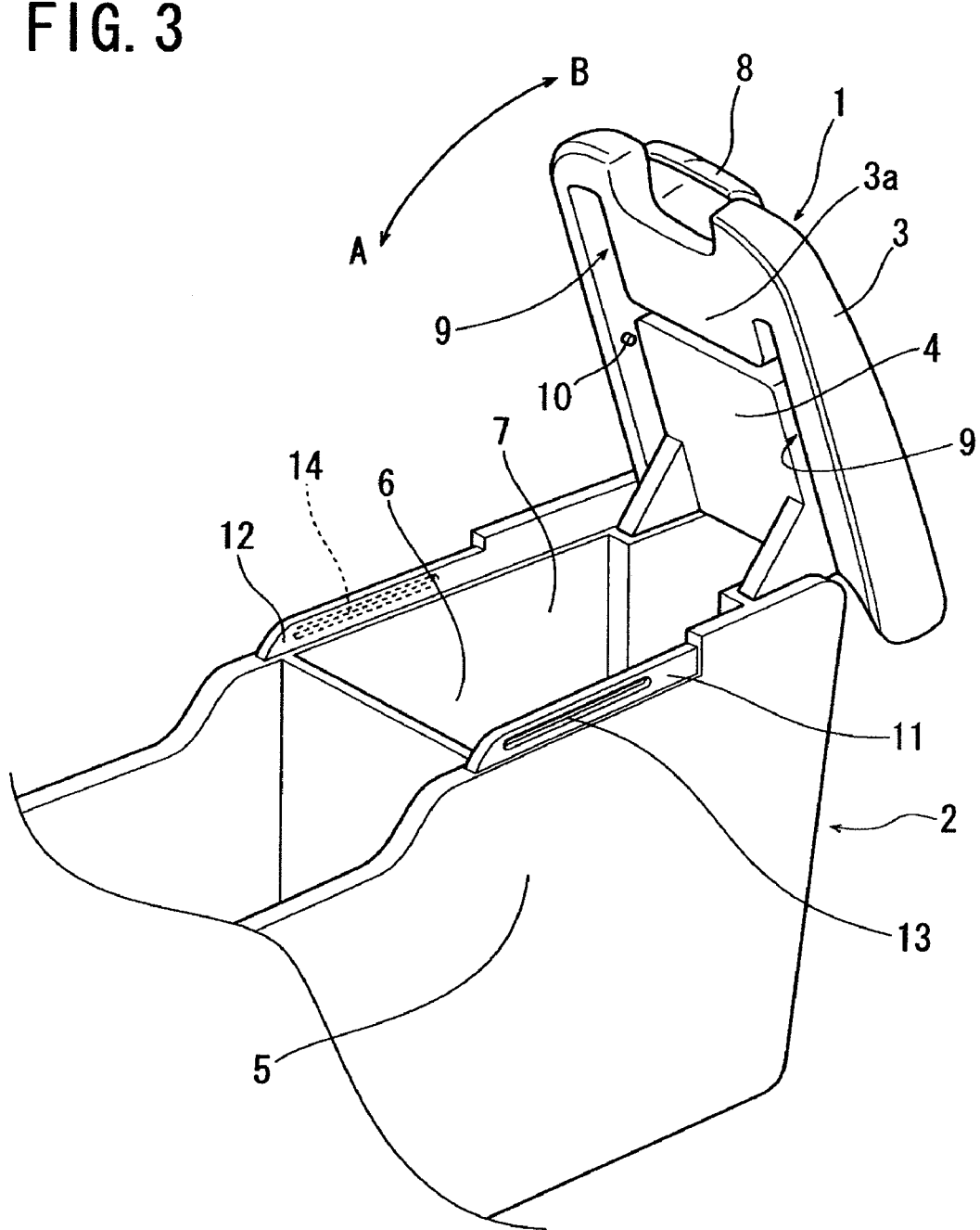
FIG. 3 is a perspective view of the vehicle console illustrated in FIG. 1, wherein the armrest is rotated to open a storage well of the console.
Figure 4:
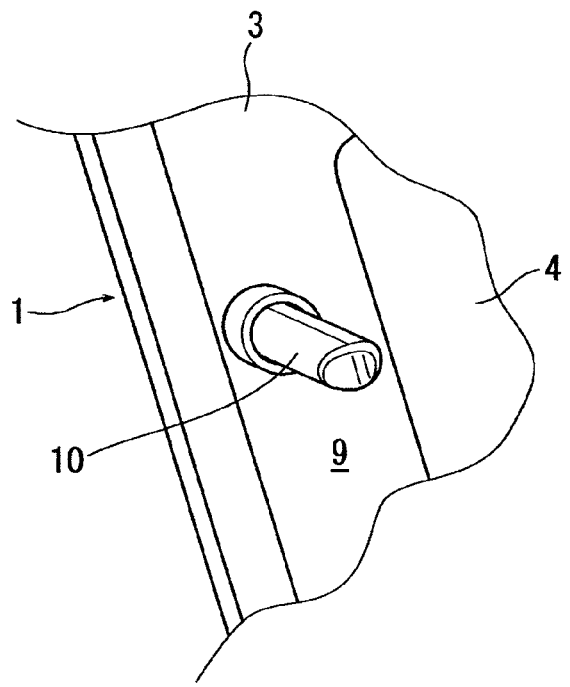
FIG. 4 is a perspective view of a part of the armrest illustrated in FIG. 3, wherein a latch member projects into a concave space.

In FIGS. 1, 6 and 8, the armrest 1 closes the opening 7 of the storage well 6 of the console 2 and the latch members 10, 10 engage with the catch holes 15, 18, respectively. In FIG. 9, the latch members 10, 10 of FIG. 8 engage with the grooves 13, 14, respectively. In FIGS. 1, 6, 8-9, the armrest 1 is in the backward position E of FIG. 5. When a vehicle driver wishes to move the armrest 1 from the backward position illustrated in FIG. 1 to the forward position illustrated in FIG. 2, the vehicle driver pulls the operation knob 8 up to rotate in the H direction and slide the projection plates 8a, 8a of the operation knob 8 on the cam face 33 of the linkage equipment 31. Thereby, the projection plates 8a, 8a move the linkage equipment 31 toward the latch members 10, 10, simultaneously with compressing the coil spring 32. When the linkage equipment 31 is displaced to the latch members 10, 10, the wedge faces 34, 35 of the linkage equipment 31 are pressed into the gap between the latch members 10, 10 and the bottom panel 3a, so that the latch members 10, 10 are drawn out of the grooves 13, 14 of the extension walls 11, 12 simultaneously with compressing the coil springs 30, 30. After that, the vehicle driver advances the armrest body 3 with keeping the operation knob 8 upheld and then releases the operation knob 8 to insert the latch members 10, 10 into a pair of the catch holes 16 and 19, or 17 and 20. Thereby, the armrest body 3 is fixed to the console 2. To open the storage well 6 of the box body 5 of the console 2, the vehicle driver pulls the operation knob 8 up to rotate in the H direction and press the wedge faces 34, 35 of the linkage equipment 31 into the gap between the latch members 10, 10 and the bottom panel 3a. Thereby, the latch members 10, 10 are drawn out of the grooves 13, 14 of the extension walls 11, 12. Then, the vehicle driver pulls the armrest body 3 up with keeping the operation knob 8 upheld, so that the armrest body 3 and the base member 4 can rotate in the B direction to open the storage well 6 of the console 2. To close the storage well 6 of the console 2, the vehicle driver pulls the operation knob 8 up and puts the latch members 10, 10 in the armrest body 3. Then, the vehicle driver pushes down on the armrest 1 to close the storage well 6 of the console 2 with keeping the operation knob 8 upheld. When the vehicle driver releases the operation knob 8 after the storage well 6 is closed by the armrest 1, the linkage equipment 31 is pushed back toward the operation knob 8 by the compression coil spring 38. Thereby, the wedge faces 34, 35 of the linkage equipment 31 is drawn back of the gap between the latch members 10, 10 and the bottom panel 3a and simultaneously, the operation knob 8 is pushed by the cam face 33 to turn in the G direction and make the latch members 10, 10 engage with the grooves 13, 14, respectively.

As illustrated in FIGS. 6, 7, 8 and 10, the operation knob 8 is provided with the projection plates 8a, 8a. The projection plates 8a, 8b abut on the cam face 33 of the linkage equipment 31 and travel up and down the cam face 33 as the operation knob 8 rotates around the pivot shaft P2.

In FIGS. 6 and 8, the operation knob 8 rotates in the G direction and is at the end of the rotation, wherein the latch members 10, 10 are inserted into the catch holes 15, 18 in order to lock the armrest 1. When the latch members 10, 10 are inserted into a pair of catch holes 15 and 18, 16 and 19, or 17 and 20, the armrest 1 can neither rotate around the pivot shaft P1 nor slide along the slide grooves 23, 24 of the base member 4. In this specification, it is referred to as a "lock mode" that the latch members 10, 10 are inserted into a pair of catch holes 15 and 18, 16 and 19, or 17 and 20 in order to prevent the armrest 1 from rotating around the pivot shaft P1 and sliding along the slide grooves 23, 24 of the base member 4. In the "lock mode", the armrest 1 neither rotates in the direction of A-B nor slides in the direction of C-D, because the latch members 10, 10 are inserted into a pair of catch holes 15 and 18, 16 and 19, or 17 and 20.

Figure 11:
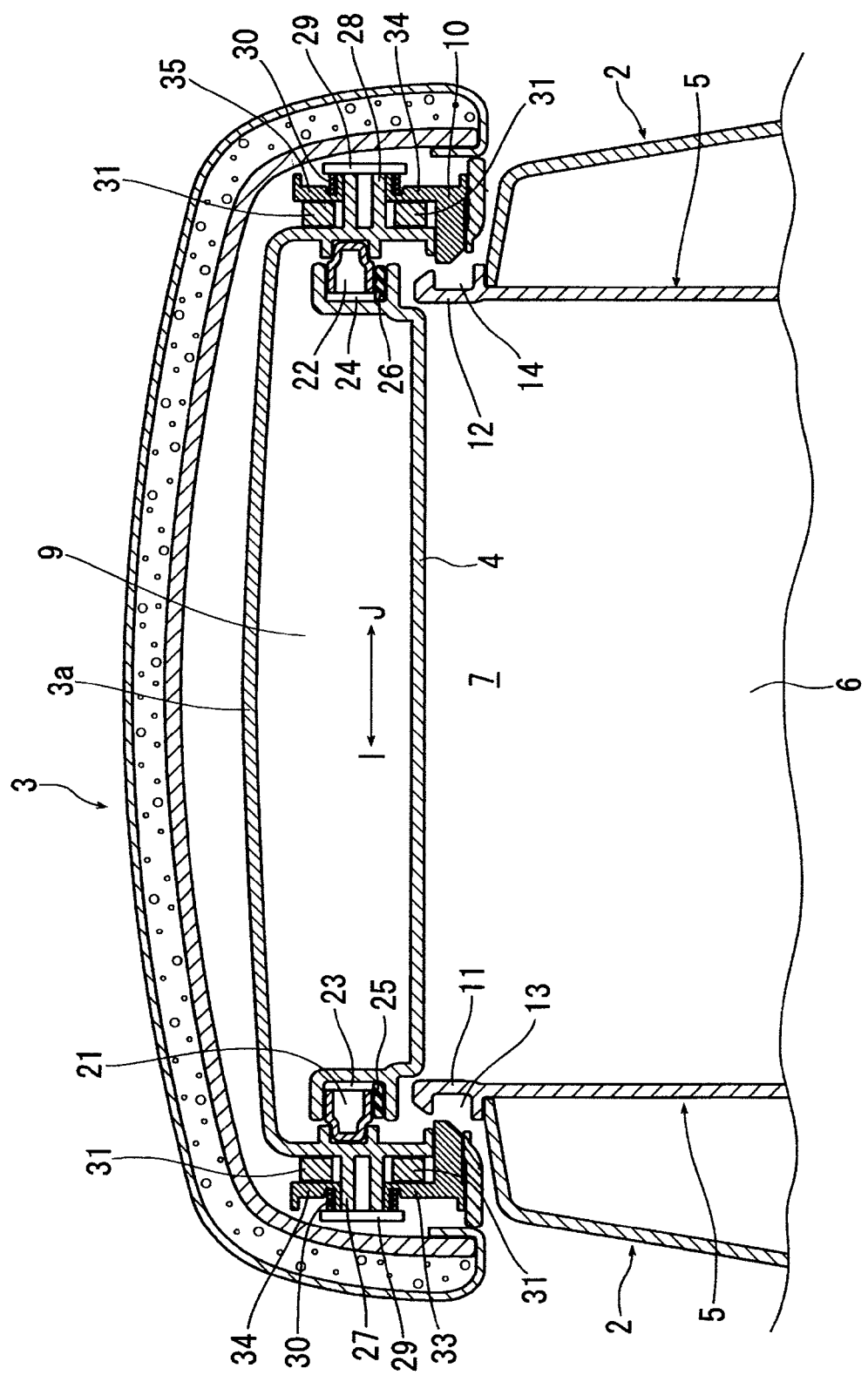
FIG. 11 is a transverse section view of the armrest illustrated in FIG. 1, wherein the armrest is in the "unlock mode".

In FIGS. 7 and 11, the operating knob 8 rotates in the H direction and is at the end of the rotation, wherein the latch members 10, 10 are drawn out of the catch holes 15, 18 and the latch members 10, 10 are also outside the grooves 13, 14 of the extension walls 11, 12 in order to unlock the armrest 1. When the latch members 10, 10 are drawn out of the catch holes 15, 18 and are also outside the grooves 13, 14 of the extension walls 11, 12, the armrest 1 can rotate around the pivot shaft P1 and also can slide along the slide grooves 23, 24 of the base member 4. In this specification, it is referred to as an "unlock mode" that the latch members 10, 10 are engaged with none of the catch holes 15-20 and the latch members 10, 10 are outside the grooves 13, 14 of the extension walls 11, 12 in order to allow the armrest 1 to rotate around the pivot shaft P1 and slide along the slide grooves 23, 24 of the base member 4. In the "unlock mode", the armrest 1 can rotate in the direction of A-B and also slide in the direction C-D, because the latch members 10, 10 are engaged with neither the catch holes 15-20 nor the grooves 13, 14 of the extension walls 11, 12.

Figure 10:
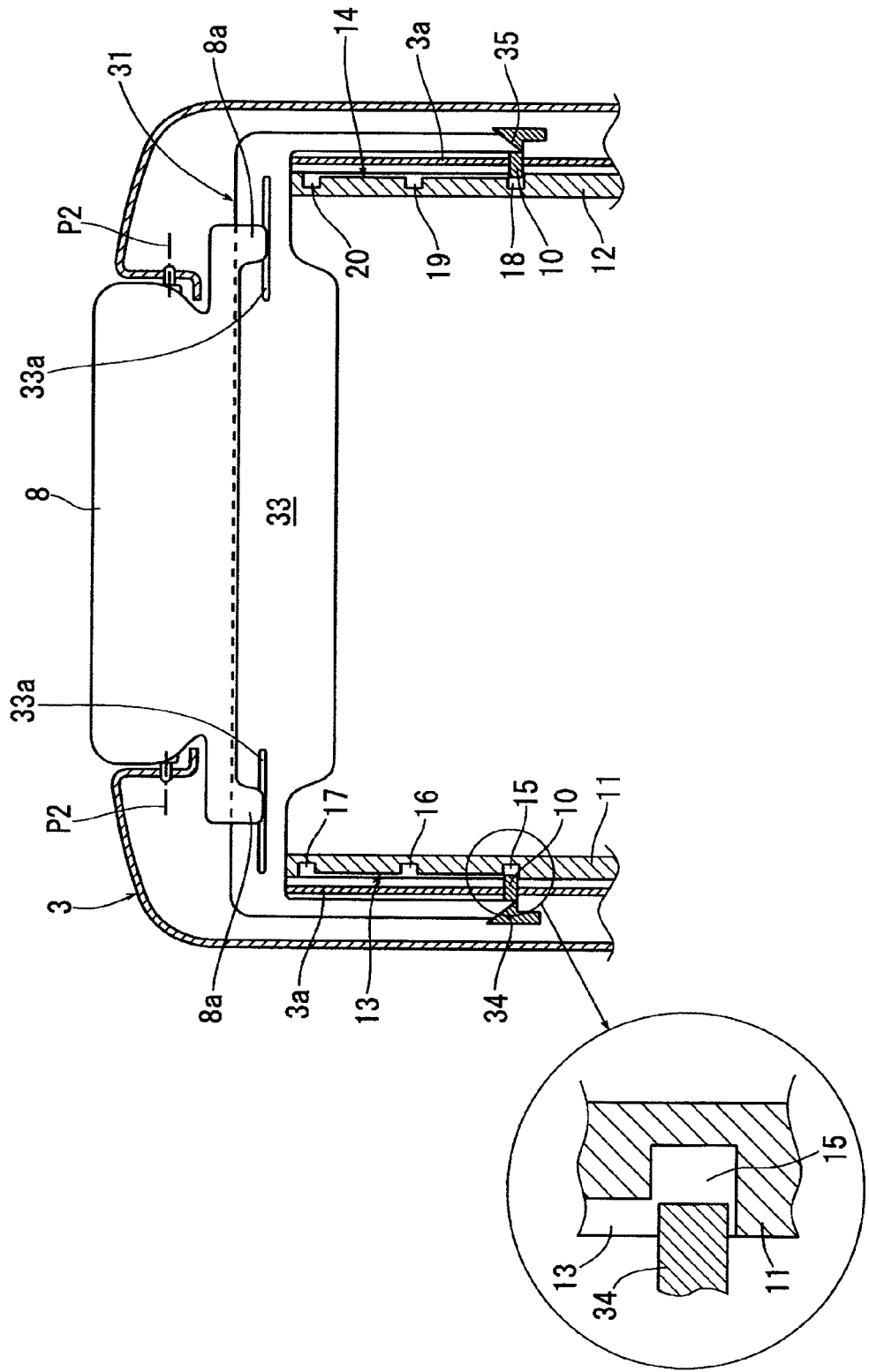
FIG. 10 is a horizontal section view of the armrest illustrated in FIG. 1, wherein the armrest is in a "semi-lock mode".

In FIG. 10, it is illustrated that the latch members 10, 10 are drawn out of the catch holes 15, 18 but the latch members 10, 10 still remain within the grooves 13, 14 of the extension walls 11, 12. Since the latch members 10, 10 still remain within the grooves 13, 14 in FIG. 10, the engagement of the latch members 10, 10 and the grooves 13, 14 prevents the armrest 1 from rotating around the pivot shaft P1. In FIG. 10, however, the latch members 10, 10 can slide along the grooves 13, 14 because the latch members 10, 10 are engaged with none of the catch holes 15-20. In this specification, it is referred to as a "semi-lock mode" that the latch members 10, 10 are engaged with the grooves 13, 14 of the extension walls 11, 12 while the latch members 10, 10 are not engaged with any of the catch holes 15-20. In the "semi-lock mode", the latch members 10, 10 can slide in the grooves 13, 14 in the direction of C-D, so that the armrest 1 is allowed to slide along the slide grooves 23, 24 of the base member 4 in the direction of C-D. In the "semi-lock mode", however, the latch members 10, 10 prevent the armrest 1 from rotating around the pivot shaft P1, so that the storage well 6 of the console 2 cannot be opened.

In FIGS. 6, 8 and 9, the armrest 1 is in the "lock mode". In the "lock mode", the operation knob 8 is at the end of the rotation toward the direction G and the projection plates 8a, 8a of the operation knob 8 abut on the upper region of the cam face 33 as shown in FIGS. 6 and 8. In FIGS. 7 and 11, however, the armrest 1 is in the "unlock mode". In the "unlock mode", the operation knob 8 is at the end of the rotation toward the direction H and the projection plates 8a, 8a of the operation knob 8 abut on the lower region of the cam face 33 as shown in FIG. 7. Furthermore, the armrest 1 is in the "semi-lock mode" in FIG. 10. In the "semi-lock mode", the operation knob 8 takes a mean position between the position of "lock mode" in FIG. 6 and the position of "unlock mode" in FIG. 7 and the projection plates 8a, 8a of the operation knob 8 abut on the intermediate region of the cam face 33. In order to indicate that the armrest 1 is in the "semi-lock mode", a pair of traverse furrows 33a, 33a can be formed on the cam face 33 of the linkage equipment 31 as shown in FIG. 12. The traverse furrow 33a, 33a are formed in the intermediate region of the cam face 33. Thereby, the projection plates 8a, 8a fall into the traverse furrows 33a, 33a, as illustrated in FIG. 10, when the operation knob 8 rotates halfway between the position of "lock mode" in FIG. 6 and the position of "unlock mode" in FIG. 7. When the projection plates 8a, 8a click into the traverse furrows 33a, 33a, a vehicle driver can feel a slight motion resistance of the operation knob 8 and find that the armrest 1 is in the "semi-lock mode". The traverse furrows 33a, 33a are in the form of recess in the above embodiment of the present invention, however, an appropriate projection, prominence or raised portion can be substituted for the traverse furrows 33a, 33a.

As described above, the present invention is explained with reference to a console box that is an interior part of vehicles such as an automobile. However, the device for locking, semi-locking and unlocking an armrest according to the present invention can be applied not only to a vehicle console but also to a storage box with an adjustable armrest that is attached to household furniture such as a chair.

What is claimed is:

1. A vehicle console with an adjustable armrest comprising, a console box having a storage well that has an opening on an upper surface of the console box;

a base member hinged to the console box to rotate between a first position where said base member extends along said opening of said storage well and a second position where said base member extends obliquely to said upper surface of said console box;

an armrest body slidably supported by said base member;

one or more grooves on an exterior surface of the console box and extending in a fore-and-aft direction of said armrest body;

a plurality of catch holes said grooves;

one or more latch members slidably supported by said armrest body and projectable and retractable with respect to said armrest body;

an operation knob rotatably attached to said armrest body; and a mechanism for reciprocating said latch members and operated by said operation knob to change length of a projecting part of said latch members so that said latch members are engaged with said grooves and said catch holes, said latch members being engaged with said grooves but disengaged from said catch holes, or said latch members being disengaged from said grooves and said catch holes.

2. The vehicle console as recited in claim 1, wherein said mechanism for reciprocating said latch member changes length of a projecting part of said latch member according to turning angle of said operation knob.

3. The vehicle console as recited in claim 1, including a bottom panel of said armrest body defining a concave space on a base side of said armrest body, wherein said base member is arranged within said concave space.

4. The vehicle console as recited in claim 3, including a pair of guide rails fixed to opposed walls of said concave space and arranged to extend in the fore-and-aft direction of said armrest body, and a pair of side grooves located on both sides of said base member and extending along said guide rails, wherein said guide rails are slidably engaged with said side grooves, respectively, to allow said armrest body to slide on said base member in the fore-and-aft direction of said armrest body.

5. The vehicle console as recited in claim 1, wherein a fore-end of said storage well of said console box has an exterior surface that is flat and smooth.

6. The vehicle console as recited in claim 3, including a pair of supporting columns on the bottom panel and supporting said pair of latch members slidably, said pair of latch members being opposed to each other in said concave space, and said latch members being biased to project into said concave space.

7. The vehicle console as recited in claim 1, wherein said grooves are on the exterior surface of an extension wall that is on the upper surface of said console box.

8. The vehicle console as recited in claim 1, wherein said catch holes are arranged with a prescribed space between the adjacent catch holes.

9. The vehicle console as recited in claim 2, wherein said mechanism for reciprocating said latch member comprises a linkage having a cam face and wedge faces, said operation knob has a projection plate abutting said cam face and traveling up and down the cam face as said operation knob rotates, and said wedge faces projecting said latch member as said linkage is driven by said operation knob.

10. The vehicle console as recited in claim 9, including a transverse furrow or prominence in the intermediate region of said cam face in order that said projection plate engages with said furrow or prominence and a slight motion resistance of said operation knob is generated when said latch members are disengaged from said catch holes but are still engaged with said grooves.

\* \* \* \* \*